June 7, 1949.　　　　A. M. RENNIE　　　　2,472,316
ELECTRON OPTICAL INSTRUMENT
Filed Nov. 28, 1947　　　　2 Sheets-Sheet 1
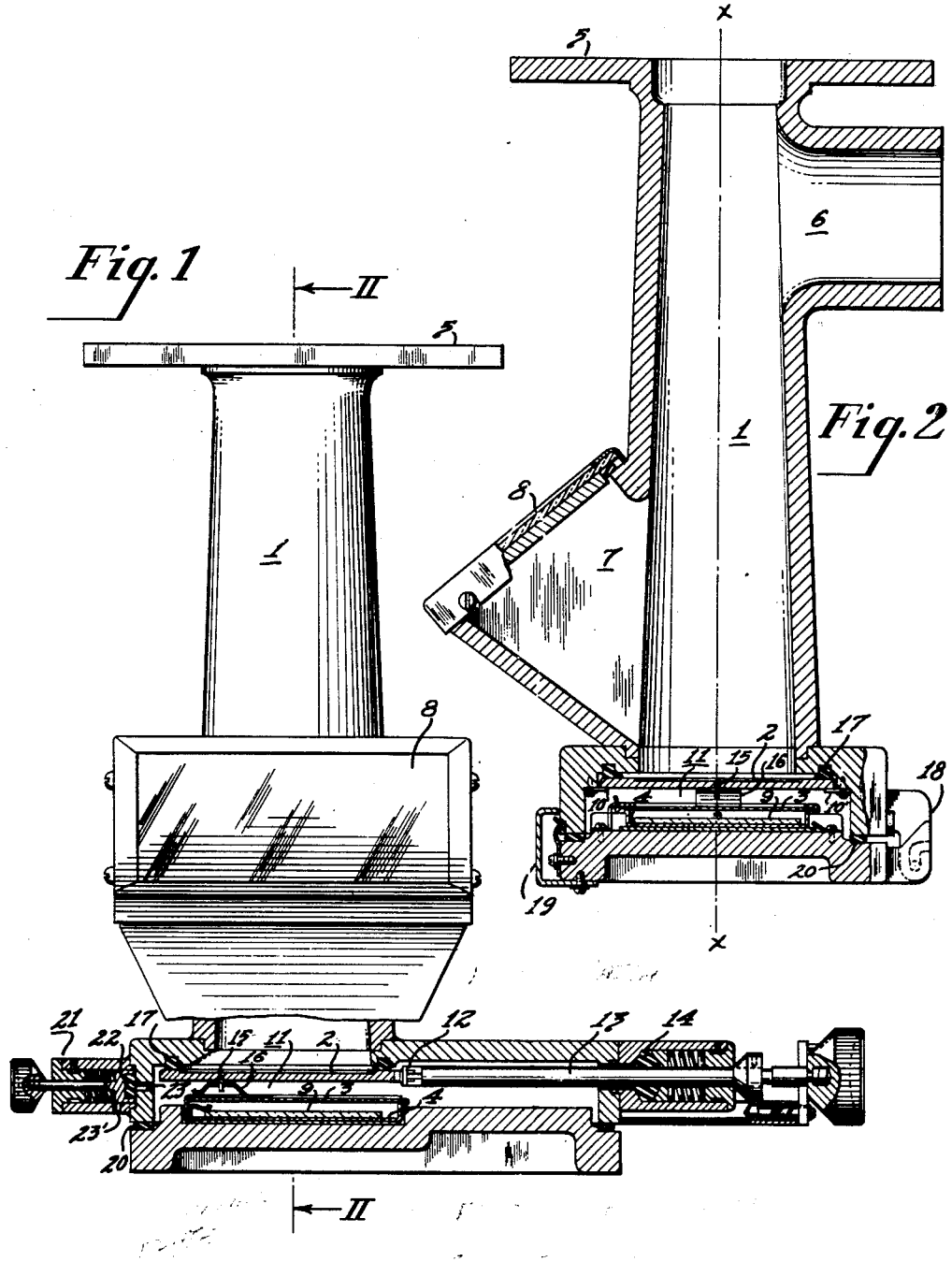
INVENTOR
*Alexander M. Rennie*
BY
ATTORNEY June 7, 1949. A. M. RENNIE 2,472,316
ELECTRON OPTICAL INSTRUMENT
Filed Nov. 28, 1947 2 Sheets-Sheet 2
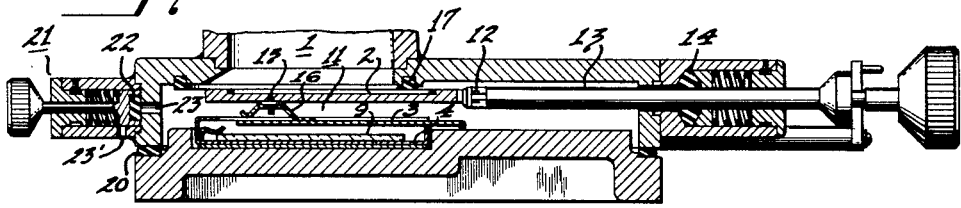
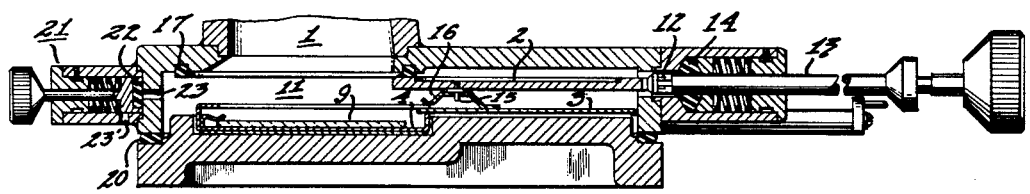
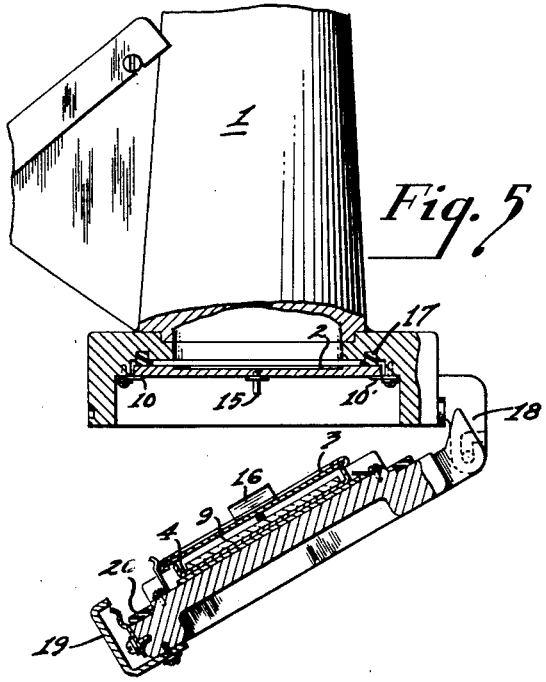
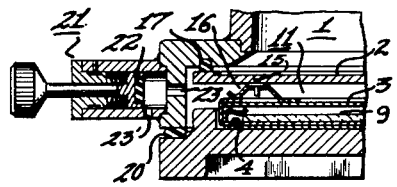
INVENTOR
Alexander M. Rennie
BY
ATTORNEY Patented June 7, 1949

2,472,316

UNITED STATES PATENT OFFICE 2,472,316

ELECTRON OPTICAL INSTRUMENT

Alexander M. Rennie, Philadelphia, Pa., assignor to Radio Corporation of America, a corporation of Delaware Application November 28, 1947, Serial No. 788,723

6 Claims. (Cl. 250—49.5)

1

This invention relates to electron optical instruments and particularly to improvements in evacuable viewing systems of the type including both a fluorescent screen and a cassette for use in electron microscopes, diffraction cameras and analogous instruments.

Many electron-optical instruments contain both a fluorescent screen and a cassette arranged along the optical axis of the instrument in such a manner that either the fluorescent screen or the photographic plate (or film) within the cassette may be presented to the beam for translating its invisible image, selectively, into a transitory fluorescent or permanent photographic image. Usually the fluorescent screen comprises a hinged plate mounted above the cassette so that the screen may be moved out of the way when the image is to be photographed. (As to this see, by way of example, George U. S. P. 2,086,546.) Alternatively, the fluorescent screen may comprise the more remote, fixed, target and the cassette the hinged target, nearer to the source of the beam. (As to this see, by way of example, Griswold 2,360,871 and Hillier 2,360,872.)

The principal objection to such prior art "viewing systems" is that in most cases both the fluorescent screen and the cassette are contained within the main chamber of the instrument, or in compartments thereof, and it is necessary to break the vacuum and repump the entire instrument in reloading the cassette. While it has previously been proposed to construct electron optical instruments with separate compartments connected by valves, the valving systems heretofore proposed for this purpose have been so complicated and expensive as to prevent their application to viewing systems for use in instruments designed for everyday use.

Accordingly, the principal object of the present invention is to provide a simple, inexpensive, compact and trouble-free viewing system of the type including both a fluorescent screen and a cassette, and one wherein the pumping time incident to reloading the cassette is minimized.

The invention will be described in connection with the accompanying drawings, wherein:

Fig. 1 is a front elevation partly in section, of an electron-optical instrument incorporating a viewing screen and cassette constructed and arranged in accordance with the principle of the invention; Fig. 2 is a sectional view taken on the line II—II of Fig. 1; Fig. 3 is a sectional view of the photographic chamber of the instrument with the screen part-way open to facilitate the evacuation of said chamber; Fig. 4 shows the

2 screen and the shutter of the instrument open all the way to expose the photographic plate within the cassette to the action of the electron-beam; Fig. 5 is a view partly in section showing how the photographic chamber may be opened for the purpose of loading and unloading the cassette, and Fig. 6 is a detailed sectional view of a valve for admitting air into the photographic chamber to facilitate opening the said chamber.

In the drawings, wherein like reference characters designate the same parts in all figures, there is shown an electron optical instrument (e. g. an electron microscope) comprising an evacuable chamber, indicated generally at 1, having a central axis $x$—$x$ (see Fig. 2) along which electrons are adapted to travel, and containing a fluorescent screen 2, a lighttight shutter 3 and a photographic plate holder or cassette 4 mounted in the order named in spaced parallel planes normal to the said electron axis $x$—$x$.

The source of the electrons, and the lens system therefor, form no part of the present invention and have been omitted from the drawings. However, it will be understood the said parts and the specimen holder of the instrument may be mounted in register with the main chamber 1, as on the flange 5, for example in the manner described in the copending application of Burger and Reisner Ser. No. 783,496, filed November 1, 1947.

When, as is usually the case, the evacuable space in the main chamber and in the said auxiliary chambers is continuous, a single port 6 in the wall of the main chamber 1 may be employed for evacuating the entire instrument. A second port 7 in a side wall of the instrument and which terminates in a glass window 8 permits inspection of the fluorescent screen 2 when the said screen comprises the target upon which the electrons are caused to impinge.

As will hereinafter more fully appear, the fluorescent screen 2 and the shutter 3 may be withdrawn (as shown in Fig. 4) from their normally closed position (shown in Figs. 1 and 2) to permit the electrons to impinge upon a photographic plate 9 in the cassette 4. During the period that the plate 9 is exposed to the electron beam the transparent window 8 may be masked, e. g. by the operator's hand, or by a cover plate not shown, or by dimming any source of light about the exterior of the instrument.

The screen 2 comprises a metal plate which is opaque to electrons and will be understood to be coated with fluorescent material on its "upper" side only. The screen or plate 2 is mounted for slideable movement into and out of register with the axis x—x, as on a pair of oppositely located tracks 10, 10' (see Figs. 2 and 5) which depend from the top inner surface of a laterally extending compartment 11 at the base of the main chamber 1. The force required to move the screen 2 on the tracks 10—10' into and out of the path of the beam is applied to the screen through a flexible coupling 12 and a draw rod 13 which extends to the exterior of the compartment 11 through a vacuum-tight bushing 14 which may conveniently be of the type described in U. S. Patent No. 2,418,903 to Frank E. Runge.

There is a dependent pin 15 fixed on the underside of the fluorescent screen 2 and a complementary catch 16 for the pin on the adjacent top surface of the laterally movable shutter 3 of the cassette 4. Thus, when the draw rod 13 is pulled out to withdraw the screen from the path of the beam the shutter 3 is moved, simultaneously, to its open position so that the electron beam may be directed upon the photographic plate 9 in the cassette 4. Movement of the rod 13 in the reverse direction, for the purpose of closing the shutter 3, returns the screen 2 to its normal position in the path of the beam. Attention is called to the fact that when the screen is in its closed position in the path of the beam (as it is in Figs. 1 and 2), its periphery lies contiguous a yieldable gasket 17 on the underside of the main chamber 1, i. e. within the photographic chamber 11.

As shown more clearly in Figs. 2 and 5, the photographic chamber 11 is removably attached to the underside of the main chamber by a hinge 18 at the rear of the instrument and by a spring latch 19 at the front. Thus, when the latch 19 is opened, the said chamber 11 may be swung downwardly and to the rear on its hinge 18 (as shown in Fig. 5) so that the cassete 4, and the closed shutter 3 thereon, may be removed from the instrument for the purpose of developing and replacing the photographic plate 9 therein. A yieldable gasket 20 on the bottom inner surface of the compartment 11 serves to maintain the vacuum in the said compartment when it is closed.

As previously set forth, the port 6 for evacuating the instrument extends through the wall of the main chamber 1. Accordingly, in order to draw out the air in the photographic chamber 11 it is necessary to move the fluorescent screen 2 off its gasket 17, as by pulling the draw rod 13 out at least part way, as shown in Fig. 3. The rod 13 should, of course, be pushed in to recenter the screen when it is desired to use the fluorescent surface thereof as the means for converting the electron-image into a visible image.

One very important practical feature of the invention is that the photographic chamber 11 may be opened without destroying the vacuum in the main chamber 1 of the instrument. As a practical matter it would of course be exceedingly difficult to open the photographic chamber when the degree of vacuum (say 0.1 of a micron) corresponds to that present during normal operation. Accordingly, the said chamber 11 is provided with a leak valve 21 comprising a plunger actuated stopper 22 which, when pulled out as shown in Fig. 6, admits air into the said chamber or compartment through a port 23, 23'. When the in-rushing air fills this chamber 11 the pressure of the atmosphere upon the lower or exposed surface of the screen 2 is exerted upon the yieldable gasket 17 about the periphery of the screen on the underside of the main chamber 1 and maintains the said chamber 1 vacuum-tight without resorting to the use of any auxiliary gasket clamping mechanism. The slight upward movement of the screen incident to the yielding of the gasket material when subject to the said pressure is permited by the flexible nature of the coupling 12 between the screen and the draw rod 13.

It will now be apparent that the present invention provides a simple, inexpensive and trouble-free viewing system of the type including both a fluorescent screen and a cassette, and one wherein the pumping time incident to reloading the cassette is minimized.

What is claimed is:

1. The combination in an electron-optical instrument having an axis along which electrons travel and containing a movable viewing screen, an electron-sensitive target and a shutter for said target mounted along said axis with said shutter normally interposed between said screen and target, of means for moving said viewing screen into and out of the path of said electrons, and means responsive to said movement of said screen for closing and opening said shutter, whereby selectively to expose said screen and said target to said electrons.

2. The invention as set forth in claim 1 and wherein said electron-sensitive target is contained within a cassette and wherein said shutter comprises a light-tight cover for said cassette.

3. In an electron optical instrument comprising an evacuable chamber having an axis along which electrons are adapted to travel, a fluorescent screen, a shutter and a cassette for an electron-sensitive photographic element mounted in the order named along said axis within said chamber, means for moving said fluorescent screen into and out of register with said cassette, and means responsive to said last mentioned movement for opening said shutter, whereby to expose said photographic element to said electrons.

4. The invention as set forth in claim 3 and wherein said screen and said shutter are mounted for movement in substantially parallel planes substantially normal to said axis.

5. The invention as set forth in claim 3 and wherein said fluorescent screen comprises an airtight closure element for that portion of said evacuable chamber to which it is presented when it is in register with said cassette.

6. The invention as set forth in claim 5 and wherein said cassette is contained in an evacuable part of said chamber adjacent to that portion of said chamber to which said screen is presented, and wherein means are provided for opening said evacuable part of said chamber for the purpose of loading and unloading said cassette.

ALEXANDER M. RENNIE.

REFERENCES CITED

The following references are of record in the file of this patent:

UNITED STATES PATENTS

| Number | Name | Date |
|---|---|---|
| 2,086,546 | George | July 13, 1937 |
| 2,200,095 | Marton | May 7, 1940 |
| 2,360,871 | Griswald | Oct. 24, 1944 |
| 2,360,872 | Hillier | Oct. 24, 1944 |